United States Patent
Silko et al.

(10) Patent No.: US 10,174,568 B2
(45) Date of Patent: Jan. 8, 2019

(54) METHODS FOR TREATING A SUBTERRANEAN WELL

(71) Applicant: SCHLUMBERGER TECHNOLOGY CORPORATION, Sugar Land, TX (US)

(72) Inventors: Nikita Yurievich Silko, Koltsovo (RU); Anatoly Vladimirovich Medvedev, Moscow (RU); Daniel Anatolievitch Kalinin, Al-Khobar (SA); Ashley Watling, Brisbane (AU)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 0 days.

(21) Appl. No.: 15/579,273

(22) PCT Filed: Jun. 2, 2015

(86) PCT No.: PCT/RU2015/000348
§ 371 (c)(1),
(2) Date: Dec. 4, 2017

(87) PCT Pub. No.: WO2016/195525
PCT Pub. Date: Dec. 8, 2016

(65) Prior Publication Data
US 2018/0163119 A1    Jun. 14, 2018

(51) Int. Cl.
*E21B 21/00* (2006.01)
*E21B 43/16* (2006.01)
(Continued)

(52) U.S. Cl.
CPC .............. *E21B 21/003* (2013.01); *C09K 8/10* (2013.01); *C09K 8/14* (2013.01); *C09K 8/32* (2013.01);
(Continued)

(58) Field of Classification Search
None
See application file for complete search history.

(56) References Cited

U.S. PATENT DOCUMENTS

| 5,501,275 A | 3/1996 | Card et al. |
| 6,465,094 B1 | 10/2002 | Dugan |

(Continued)

OTHER PUBLICATIONS

International Search Report and Written Opinion issued in International Patent Application No. PCT/RU2015/000348 dated Mar. 10, 2016; 8 pages.

*Primary Examiner* — Anuradha Ahuja
(74) *Attorney, Agent, or Firm* — Michael L. Flynn; Robin Nava

(57) ABSTRACT

A treatment fluid that comprises a carrier fluid and a degradable material in the form of particles, fibers or both is provided or prepared. The treatment fluid is placed in a borehole such that the treatment fluid contacts a liner, a downhole filter, perforations, natural fractures, induced fractures, or a subterranean formation or combinations thereof. The treatment fluid is allowed to flow into the liner, downhole filter, perforation, natural or induced fracture or subterranean formation such that the degradable material forms at least one plug or filter cake (or both), preventing or reducing further fluid movement between the wellbore and the subterranean formation. The degradable material is then allowed to dissolve after a period of time, causing the plug or filter cake (or both) to weaken, thereby allowing removal of the plug or filter cake (or both) and reestablishing fluid movement between formation and the wellbore.

16 Claims, 4 Drawing Sheets

(51) Int. Cl.
  *C09K 8/42*   (2006.01)
  *C09K 8/32*   (2006.01)
  *C09K 8/508*  (2006.01)
  *E21B 43/26*  (2006.01)
  *C09K 8/10*   (2006.01)
  *C09K 8/14*   (2006.01)

(52) U.S. Cl.
  CPC .............. *C09K 8/426* (2013.01); *C09K 8/508* (2013.01); *E21B 43/26* (2013.01); *C09K 2208/08* (2013.01); *C09K 2208/26* (2013.01)

(56) References Cited

U.S. PATENT DOCUMENTS

| | | |
|---|---|---|
| 6,818,594 B1 | 11/2004 | Freeman et al. |
| 7,275,596 B2 | 10/2007 | Willberg et al. |
| 2004/0261996 A1 | 12/2004 | Munoz, Jr. et al. |
| 2006/0113077 A1* | 6/2006 | Willberg ............ C09K 8/42 166/280.1 |
| 2008/0093073 A1* | 4/2008 | Bustos ............... C09K 8/68 166/279 |
| 2012/0067581 A1 | 3/2012 | Auzerais et al. |
| 2012/0329683 A1* | 12/2012 | Droger ............... C09K 8/68 507/219 |
| 2014/0116702 A1* | 5/2014 | Tang ................. C09K 8/68 166/295 |

* cited by examiner

METHODS FOR TREATING A SUBTERRANEAN WELL

BACKGROUND

The statements in this section merely provide background information related to the present disclosure and may not constitute prior art.

The present disclosure broadly relates to compositions and methods for controlling fluid flow between a wellbore and a subterranean formation.

During well construction, well production and well abandonment it may be necessary to perform operations which require minimizing or terminating fluid flow between wellbore and formation. In the majority of cases, such operations are performed to restore, prolong or enhance the production of hydrocarbons. In addition, the production tubing, artificial lift equipment or casing may be removed and replaced during a workover operation.

To maintain well control, workover operations require that the well be filled with fluid with hydrostatic pressure in excess of the reservoir pressure. It is commonly referred as well "kill" operation. Well kills may be achieved by a variety of means, including the introduction of drilling or completion fluids that exert sufficient hydrostatic pressure in the wellbore to prevent formation fluid production. The fluid is often maintained in the wellbore for the entire duration of the workover operation. In some instances fluid leaks off into formation and fluid level cannot be maintained. Differential depletion of reservoir layers or large height of the reservoir presents another challenge—workover or kill fluid may be lost into one layer while other(s) flow reservoir fluids or gas into the wellbore. It is necessary to prevent formation fluids from entering the well during the procedures.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The present disclosure reveals compositions and methods by which well control may be maintained during well construction, workover or well-intervention operations in a subterranean well without damaging formation.

In an aspect, embodiments relate to methods for treating a subterranean well having a borehole. A treatment fluid is provided that comprises a carrier fluid, as well as degradable particles, or degradable fibers, or combination thereof. The treatment fluid is placed in the borehole such that the treatment fluid contacts a liner, a downhole filter, perforations or subterranean formation or combinations thereof. The treatment fluid is allowed to flow into the liner, downhole filter, perforation, natural or induced fracture or subterranean formation such that the particles and fibers form at least one plug or filter cake (or both), preventing or reducing further fluid movement between wellbore and subterranean formation.

In a further aspect, embodiments relate to methods for treating a subterranean well having a borehole. A treatment fluid is provided that comprises preparing of a treatment fluid comprising a carrier fluid, as well as degradable particles, or degradable fibers, or combination thereof.

In yet a further aspect, embodiments relate to methods for treating a subterranean well having a borehole. A treatment fluid is prepared that comprises a carrier fluid, as well as degradable particles, or degradable fibers, or combination thereof. The treatment fluid is placed in the borehole such that the treatment fluid contacts a liner, a downhole filter, perforations or subterranean formation or combinations thereof. The treatment fluid is allowed to flow into the liner, downhole filter, perforation, natural or induced fracture or subterranean formation such that the particles and fibers form at least one plug or filter cake (or both), preventing or reducing further fluid movement between wellbore and subterranean formation. The fibers and particles are then allowed to dissolve after a period of time, causing the plug or filter cake (or both) to weaken, thereby allowing removal of the plug or filter cake (or both) and reestablishing fluid movement between formation and the wellbore.

In yet a further aspect, embodiments relate to methods for controlling the movement of fluids in a subterranean well having a borehole. A treatment fluid that comprises a carrier fluid, as well as degradable particles, or degradable fibers, or combination thereof is provided or prepared. The treatment fluid is placed in the borehole such that the treatment fluid contacts a liner, a downhole filter, perforations or subterranean formation or combinations thereof. The treatment fluid is allowed to flow into the liner, downhole filter, perforation, natural or induced fracture or subterranean formation such that the particles and fibers form at least one plug or filter cake (or both), preventing or reducing further fluid movement between wellbore and subterranean formation. The fibers and particles are then allowed to dissolve after a period of time, causing the plug or filter cake (or both) to weaken, thereby allowing removal of the plug or filter cake (or both) and reestablishing fluid movement between formation and the wellbore.

In yet a further aspect, embodiments relate to methods for preventing or reducing further fluid movement between wellbore and subterranean formation during workover operations.

As particle/fibers dissolution is close to full dissolution there will be no post treatment required and artificial lift equipment wear due to undissolved solids is minimized.

BRIEF DESCRIPTION OF THE DRAWINGS

The manner in which the objectives of the present disclosure and other desirable characteristics may be obtained is explained in the following description and attached drawings in which.

DETAILED DESCRIPTION

Figure 1:
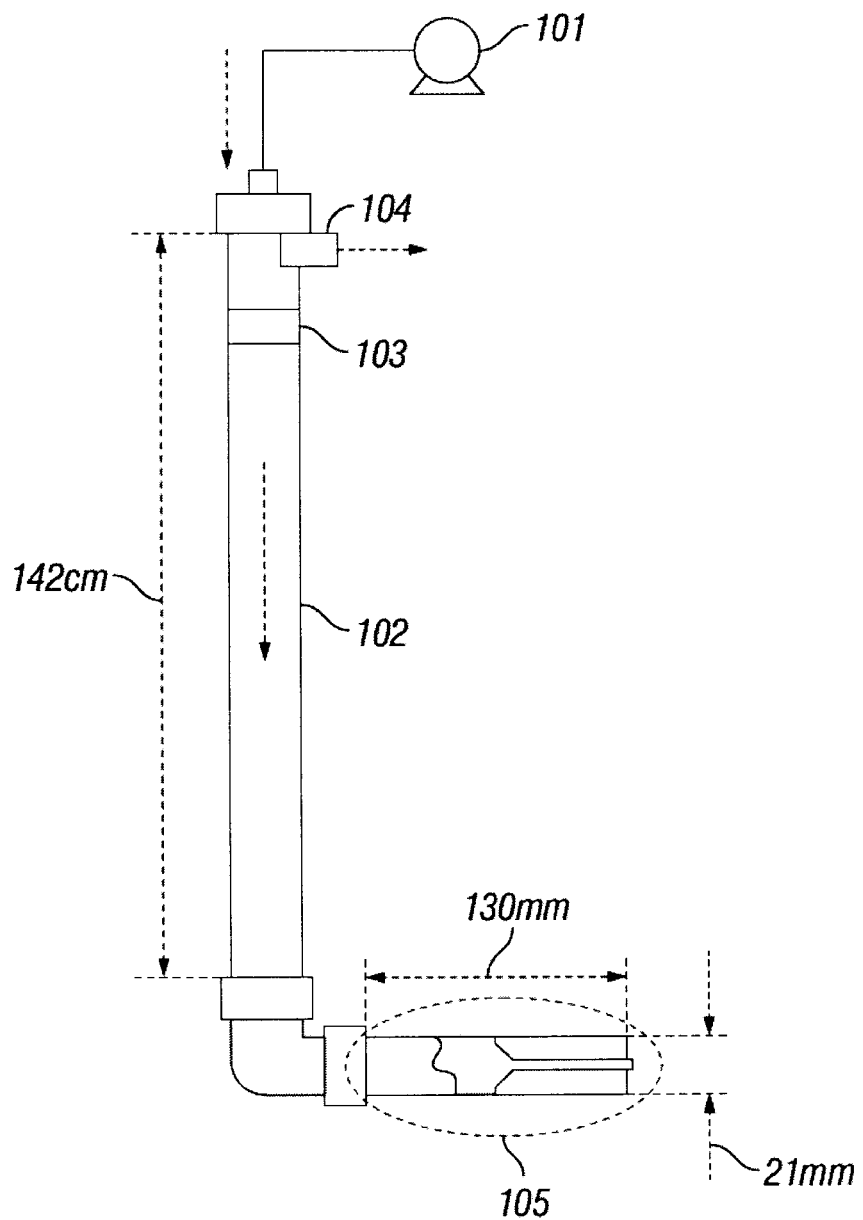
FIG. 1 shows a schematic diagram of the bridging testing apparatus used in the example one.

Although the following discussion emphasizes the formation of filter cakes, or plugs (or both) for well control during workover operations, the formulation described and methods of the disclosure may also be used during drilling, cementing and other operations during which it is required to terminate or reduce fluid flow between wellbore and subterranean formation.

The disclosure will be described in terms of treatment of vertical wells, but is equally applicable to wells of any orientation. The disclosure will be described for hydrocarbon-production wells, but it is to be understood that the disclosed methods can be used for wells for the production of other fluids, such as water or carbon dioxide, or, for example, for injection or storage wells. It should also be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the Applicants appreciate and understand that any and all data points within the range are to be considered to have been specified, and that the Applicants have possession of the entire range and all points within the range.

The applicants have determined that an effective treatment fluid may comprise water-based fluid or oil based fluid, breaker, degradable particles and degradable fibers. The treatment fluid, also known in the art as a "kill pill," minimizes the flow of formation fluids into the wellbore during workover, drilling or completion operations, while simultaneously preventing or minimizing the leakoff of wellbore fluids into the formation matrix.

The combination of fibers and particles in the kill pill may improve the efficiency of plug or filter cake (or both) formation. During placement in the wellbore, the fibers and particles may accumulate in openings of slotted liners or downhole filters, or in perforations or cracks or fissures in the formation, or on the formation surface. The accumulation forms a low permeability plug or filter cake that resists further fluid movement. Once is place, the plug or filter cake remains impermeable for practical purposes until the wellbore operation is completed. The fibers and particles may then dissolve with time, reestablishing fluid flow between formation and the wellbore. The kill pill may be non-damaging to the formation. The fiber and particles dissolution time may be shortened by including a degradation accelerant in the fluid or circulating the accelerant past the plug or filter cake, thereby saving valuable rig time and reducing costs.

In downhole conditions the fibers and particles made of a degradable (polymer) material are subjected to degradation and dissolving. Herein the process of degradation means the loss of mechanical strength and disintegration of solid material into parts. Dissolving means the complete stage of degradation, when the solid material converts into fluid-soluble state. These two processes are interrelated and may be considered in this text as interchangeable concepts.

In an aspect, embodiments relate to methods for treating a subterranean well having a borehole. A treatment fluid is provided that comprises a carrier fluid, as well as degradable particles, or degradable fibers, or combination thereof. The treatment fluid is placed in the borehole such that the treatment fluid contacts a liner, a downhole filter, perforations or subterranean formation or combinations thereof. The treatment fluid is allowed to flow into the liner, downhole filter, perforation, natural or induced fracture or subterranean formation such that the particles and fibers form at least one plug or filter cake (or both), preventing or reducing further fluid movement between wellbore and subterranean formation.

In a further aspect, embodiments relate to methods for treating a subterranean well having a borehole. A treatment fluid is provided that comprises preparing of a treatment fluid comprising a carrier fluid, as well as degradable particles, or degradable fibers, or combination thereof.

In yet a further aspect, embodiments relate to methods for treating a subterranean well having a borehole. A treatment fluid is prepared that comprises a carrier fluid, as well as degradable particles, or degradable fibers, or combination thereof. The treatment fluid is placed in the borehole such that the treatment fluid contacts a liner, a downhole filter, perforations or subterranean formation or combinations thereof. The treatment fluid is allowed to flow into the liner, downhole filter, perforation, natural or induced fracture or subterranean formation such that the particles and fibers form at least one plug or filter cake (or both), preventing or reducing further fluid movement between wellbore and subterranean formation. The fibers and particles are then allowed to dissolve after a period of time, causing the plug or filter cake (or both) to weaken, thereby allowing removal of the plug or filter cake (or both) and reestablishing fluid movement between formation and the wellbore.

In yet a further aspect, embodiments relate to methods for controlling the movement of fluids in a subterranean well having a borehole. A treatment fluid that comprises a carrier fluid, as well as degradable particles, or degradable fibers, or combination thereof is provided or prepared. The treatment fluid is placed in the borehole such that the treatment fluid contacts a liner, a downhole filter, perforations or subterranean formation or combinations thereof. The treatment fluid is allowed to flow into the liner, downhole filter, perforation, natural or induced fracture or subterranean formation such that the particles and fibers form at least one plug or filter cake (or both), preventing or reducing further fluid movement between wellbore and subterranean formation. The fibers and particles are then allowed to dissolve after a period of time, causing the plug or filter cake (or both) to weaken, thereby allowing removal of the plug or filter cake (or both) and reestablishing fluid movement between formation and the wellbore.

Among the applications, methods to prevent or reduce further fluid movement between the wellbore and the subterranean formation during workover operations.

For all aspects, the carrier fluid may be a water-based fluid, for example, fresh water, brine, water-based drilling fluid. The fresh water may also contain clay stabilizers such as potassium chloride, tetra methyl ammonium chloride, choline chloride and the like. The water may also be free of bacteria and enzymes that could cause polymer degradation and premature viscosity loss. Polymer breakers may be employed to further reduce potential for formation damage.

For all aspects, the carrier fluid may be a water solution of polymer. The water soluble polymer may comprise one or more of the following materials: guar, hydroxypropyl guar, carboxymethylhydroxyethyl guar, carboxymethylhydroxypropyl guar, methylcellulose, ethylcellulose, hydroxyethylcellulose, hydroxypropylcellulose, carboxymethylcellulose, d-glucopyranuronic acid polymer with 6-deoxy-1-mannose, d-glucose and d-mannos, acetone-formaldehyde-sodium bisulfite polymer, xanthan gum, diutan gum, of polyacrylamide or combinations thereof.

For all aspects, the carrier fluid may be an oil based fluid, for example, oil based drilling fluid, produced oil, diesel oil, synthetic oil.

For all aspects, the carrier fluid further comprising additives, for example, clay stabilizers, chelating agents, biocide, polymer breakers, mutual solvent, and combinations thereof.

For all aspects, the particles may be granular, lamellar or any other shape. The particles may be granular, lamellar or both. The particle concentration in the composition may vary between 5 kg/m³ and 603 kg/m³. The particles may be selected from degradable plastics, biodegradable materials or combination thereof. The particles may have an average particle size (d50) between 5 micrometers and 500 micrometers. The particles may also be present in at least two discrete granulometric groups, each group having a different $d_{50}$. Such multimodal particle-size distributions may improve the packing efficiency of the particles and enhance the strength and durability of the plug or filtercake.

For all aspects, the fibers may comprise substituted and unsubstituted lactide, glycolide, polylactic acid, polyglycolic acid, a copolymer of polylactic acid and polyglycolic acid, a copolymer of glycolic acid with other hydroxy-, carboxylic acid-, or hydroxycarboxylic acid-containing moieties, a copolymer of lactic acid with other hydroxy-, carboxylic acid or hydroxycarboxylic acid-containing moieties, hydroxyacetic acid (glycolic acid) with itself or other hydroxy-, carboxylic acid-, or hydroxycarboxylic acid-containing moieties, polyvinyl alcohol, polyamide or polyethyleneterephtalate or combinations thereof. One chooses the appropriate fibers depending on the anticipated well temperature. For example, polylactic acid and polyvinylalcohol fibers may be selected for well temperatures below about 80° C. Other fibers in the list may be suitable for use at temperatures up to 200° C. or higher.

The polymer fibers may have a variety of configurations. As used herein, the term "fiber" is meant to include fibers as well as other particulates that may be used as or function similarly to fibers for the purposes and applications described herein, unless otherwise stated or as is apparent from its context. These may include various elongated particles that appear as fibers or are fiber-like. The fibers or particulates may be straight, curved, bent or undulated. Other non-limiting shapes may include generally spherical, rectangular, polygonal, etc. The fibers may be formed from a single particle body or multiple bodies that are bound or coupled together. The fibers may be comprised of a main particle body having one or more projections that extend from the main body, such as a star-shape. The fibers may be in the form of platelets, disks, rods, ribbons, etc. The fibers may also be amorphous or irregular in shape and be rigid, flexible or plastically deformable. Fibers or elongated particles may be used in bundles. A combination of different shaped fibers or particles may be used and the materials may form a three-dimensional network within the fluid with which they are used. For fibers or other elongated particulates, the particles may have a length of less than about 1 mm to about 30 mm or more. In certain embodiments the fibers or elongated particulates may have a length of 12 mm or less with a diameter or cross dimension of about 200 microns or less, with from about 10 microns to about 200 microns being typical. For elongated materials, the materials may have a ratio between any two of the three dimensions of greater than 5 to 1. In certain embodiments, the fibers or elongated materials may have a length of greater than 1 mm, with from about 1 mm to about 30 mm, from about 2 mm to about 25 mm, from about 3 mm to about 20 mm, being typical. In certain applications the fibers or elongated materials may have a length of from about 1 mm to about 10 mm (e.g. 6 mm). The fibers or elongated materials may have a diameter or cross dimension of from about 5 to 100 microns and/or a denier of about 0.1 to about 20, more particularly a denier of about 0.15 to about 6.

The materials used in forming the degradable particles and fibers may be used in combination with a dissolution accelerant. The degrading/dissolution accelerant facilitates degrading of the fibers and particles at those temperatures in which these materials are used and can be any material that facilitates such dissolution. Typically, the degradation/dissolution accelerant will be a pH adjusting material, such as a base, an acid, or a base or acid precursor that forms bases or acids in situ. The degradating accelerant may also be an oxidizer.

The polymers used in forming the degradable fibers may be used in conjunction with a fiber degrading accelerant. The fiber degrading accelerant facilitates degrading of the fibers at those temperatures in which the polymer fibers are used and can be any material that facilitates such degradation. The particular fiber degrading accelerant may be selected, designed and configured to provide a selected degradation rate at selected temperatures and conditions in which the fibers are to be used. For example, the fiber degrading accelerant may facilitate providing a fiber degradation rate of about 20%, 30%, 40%, 50%, 60%, 70%, 80%, 90% up to 100% fiber degradation by weight or less over a period of from about 1 day to about 8 weeks (56 days) at downhole temperature conditions. In certain applications, a degradation rate of from about 20% to about 40% by weight over a period of from about 1 day to about 56 days at downhole temperature conditions may be particularly useful. Typically, the fiber degrading/dissolving accelerant will be a pH adjusting material, such as a base, an acid, or a base or acid precursor that forms bases or acids in situ. The fiber degrading/dissolving accelerant may also be an oxidizer.

Those bases for use as the fiber degrading/dissolving accelerant can be any base or base precursor that facilitates the desired controlled degradation of the polymer fibers under the conditions in which the fibers are employed. The base may be one that that provides a pH of about 11 or 12 or more in the fluids or environment surrounding the polymer fibers. The base may be that provided from a low solubility oxide or hydroxide that slowly dissolves in aqueous fluids used with the fibers at the formation temperatures for which the polymer fibers are employed. Non-limiting examples of such low solubility bases include calcium hydroxide, calcium oxide, magnesium hydroxide, magnesium oxide, zinc oxide, and combinations of these. In cases where the bases produce polyvalent ions, such as $Ca^{2+}$ and $Mg^{2+}$, it may be desirable to use fibers that do not degrade to form diacids such as nylon 6 and nylon 11. Bases that have higher solubility, such as sodium hydroxide, potassium hydroxide, barium hydroxide, lithium hydroxide, rubidium hydroxide, cesium hydroxide, and combinations of these, may also be used provided their effect on the polymers provides the desired delay or controlled degradation of the fibers. This may be facilitated by encapsulation or the use of other delayed release techniques.

The acids employed as the fiber degrading accelerant may be any acid or acid precursor that facilitates the desired controlled degradation or hydrolysis of the polymer fibers under the conditions in which the fibers are employed. These may be Lewis acids or Bronsted acids. The acid may provide a pH of about 3 or less in the fluids or environment surrounding the polymer fibers. The acid may be a low solubility acid that slowly dissolves in aqueous fluids used with the fibers at the formation temperatures. Non-limiting examples of such low solubility acids may include oleic acid, benzoic acid, nitrobenzoic acid, stearic acid, uric acid, fatty acids, and derivatives of these, and their combinations. Other acids having higher solubility, such as hydrochloric acid, citric acid, acetic acid, formic acid, oxalic acid, maleic acid, fumaric acid, etc. Other soluble organic acids may also be used. Such soluble acids may also be used provided their effect on the polymers provides the desired delay or controlled degradation of the fibers. This may be facilitated by encapsulation or the use of other delayed release techniques. Lewis acids of $BF_3$, $AlCl_3$, $FeCl_2$, $MgCl_2$, $ZnCl_2$, $SnCl_2$, and $CuCl_2$ may be also used.

Oxidizers may also be used as the fiber degrading accelerant. Oxidizers may have unique properties that may cause them to have dual functions. Non-limiting examples of suitable oxidizers include bromates, persulfates, nitrates, nitrites, chlorites, hypochlorites, perchlorites, and perborates, and combinations of these. Specific non-limiting examples of these materials include sodium bromate, ammonium persulfate, sodium nitrate, sodium nitrite, sodium chlorite, sodium hypochorite, potassium perchlorite, and sodium perborate. At temperatures where the oxidative half-life is sufficient, the oxidizers act as oxidizers and degrade the polymers through oxidation. At higher temperatures where their oxidative half-life is short, they may be reduced (generally by water) and turn into their acidic counterpart, thus lowering the fluid pH so that they create a pH-induced hydrolysis of the polymers. Thus, for example, persulfate may be reduced to sulfuric acid, which then hydrolyzes the polymers. The oxidizers may be selected to have low solubility in the aqueous fluids used with the polymer fibers at the temperatures the fibers are used. In other embodiments, the oxidizers may be readily soluble in such fluids but may be encapsulated or used with other delayed release techniques to delay or control release of the oxidizer.

Another fiber degrading accelerant includes other degradable polymers. The degradable polymers used as the fiber degrading accelerant are characterized in that they degrade more readily than the polymers at certain conditions, such as lower temperature, and they facilitate the degradation of the fibers. Such degradable polymers may degrade at a rate of at least 10 times faster than the polymers at the same environmental conditions. The degradation of the polymer may include degradation of the polymer into species that facilitate the degradation of the polymer fibers. These may be "polymeric acid precursors" that are typically solids at room temperature. The polymeric acid precursor materials may include the polymers and oligomers that hydrolyze or degrade in certain environments under known and controllable conditions of temperature, time and pH to release acids. The acids formed from such polymers may be monomeric acids but may also include dimeric acid or acid with a small number of linked monomer units that function similarly, for purposes of embodiments of the invention described herein, to monomer acids composed of only one monomer unit.

Non-limiting examples of such degradable polymers for use of the fiber degrading accelerant include polymers and copolymers of lactic acid, glycolic acid, vinyl chloride, phthalic acid, etc., and combinations of these. Polylactic acid (PLA) and polyglycolic acid (PGA) degrade to form the organic acids of lactic acid and glycolic acid, respectively. Polyvinyl chloride (PVC) degrades to form the inorganic acid of hydrochloric acid. Phthalic acid polymer materials may include polymers of terephthalic and isophthalic acid. Polyester and polyamide materials formed from diacids that degrade into acids at the desired rate and environmental conditions to form the fiber degrading accelerant may also be used.

The fiber degrading accelerant may be used with the polymer fibers in a number of different ways. In one embodiment, the accelerant is formed from a material that is merely intermixed in the treatment fluid or portion thereof with the polymer fibers and is selected to slowly release the fiber degrading accelerant within the treatment fluid in contact with the surrounding polymer fibers over time when at the temperature in which the polymers are to be employed, such as those formation temperatures previously discussed. Such fiber degrading accelerant materials are not encapsulated and may be selected so that they release the fiber degrading accelerant within the treatment fluid over a period of at least one (1) hour when at the formation temperature, more particularly from about one (1) hour to about 14 hours, still more particularly from about one (1) hour to about one (1) day. Such materials may include slowly dissolving bases, acids, oxidizers, and their precursors, such as the polymeric acid precursors, as has been discussed previously. The materials may be configured as solid particles, which may be granules, fibers and other particulate shapes and configurations. The size and shape may also facilitate the rate of release of the accelerant. For example, larger particle sizes and particles with smaller surface area may provide longer release times than smaller particles or those with larger surface areas. A combination of different sized and configured particles may also be used. Those degradable polymers formed from polymeric acid precursors previously discussed that are more readily degraded at the formation temperatures and form acids useful as a fiber degrading accelerant may be used and formed into fibers that are used in combination with the polymer fibers. Such fibers may be sized, shaped and configured the same or similarly as discussed previously with respect to the polymer fibers.

In another embodiment, the fiber degrading accelerant materials are incorporated into the polymer fibers themselves. This may be accomplished through mixing, blending or otherwise compounding the fiber degrading accelerant materials with the base polymer used to form the polymer fibers before the polymers are extruded or otherwise formed into fibers. This may include any of the fiber degrading accelerant materials previously discussed provided they are capable of being mixed, blended or compounded with the base polymers prior to extrusion or the formation of the fibers. The additive materials to the fibers may be substantially uniformly distributed throughout the individual fiber matrix in this manner. Alternatively, the additive may be non-uniformly distributed throughout the fiber. Incorporating the fiber degrading accelerant into the fiber ensures that the degrading accelerant remains with the fibers in the treatment fluid and contributes to their degradation once in place. Particularly well suited for this application are the low temperature degradable polymer materials previously discussed above. In certain instances, the fiber degrading accelerant may be incorporated with the fiber by applying the degrading accelerant as a coating that is applied to the already formed polymer fibers.

In still another application, an encapsulating material may be used with the fiber degrading accelerant. The encapsulation allows for the controlled release of the active substance. In this way, degrading materials that are more active or cause more rapid degradation of the fiber materials may be used as the encapsulation contributes to the slow or delayed release of such materials. This may include acids, bases, oxidizers or other degrading accelerants that are more soluble in the aqueous fluids at the temperatures for which the polymers are used. Less soluble or slowly soluble materials may also be encapsulated, however. The encapsulating material may be selected and configured to provide the desired delay or controlled release of the fiber degrading accelerant. Different types of encapsulating materials may be used with the same or different accelerants. The encapsulated materials may also have different sizes and configurations.

As an example of an encapsulated degrading accelerant, oxidizers such as sodium bromate or diammonium peroxidisulhate may be encapsulated in copolymers of vinylidene chloride and methyl acrylate.

In use, the encapsulated accelerant is intermixed in the treatment fluid or portion thereof with the polymer fibers. Incorporated with the fiber system, the encapsulated degrading accelerant may be released in a delayed and progressive fashion, allowing a controlled and continuous degradation of the polymer fibers. The encapsulating enclosure may be selected and configured so that it releases the fiber degrading accelerant within the treatment fluid over a period of at least one (1) hour when at the formation temperature, more particularly from about one (1) hour to about 14 hours, still more particularly from about one (1) hour to about one (1) day. Such delay may also be provided by the degree of solubility of the encapsulated material. Thus, the desired control and delay may therefore be affected by a combination of the encapsulating material and the accelerant material itself.

In another embodiment, the polymer fibers are formed as bi- or multi-component fibers with other degradable polymers, such as those previously described. In such instances, the polymers are not blended or compounded together prior to extrusion but are coextruded or formed separately as separate components of the same fiber. This may accomplished, for example, by coextrusion where separate streams of each polymer component is directed from a supply source through a spinning head (often referred to as a "pack") in a desired flow pattern until the streams reach the exit portion of the pack (i.e. the spinnerette holes) from which they exit the spinning head in the desired multi-component relationship. The formation of multi-component polymer fibers is described in U.S. Pat. No. 6,465,094, which is herein incorporated in its entirety for all purposes. The various components of the multi-component fibers may be arranged and configured in a variety of different configurations, such as sheath-core fibers with single or multiple cores, different layers, etc. Either of the polymer or the degradable polymer fiber degrading accelerant may be used as the core or sheath. In certain embodiments, the degradable polymer and degrading accelerant forms the core or cores, with the polymer forming the sheath or outer layer. The multi-component fibers may be configured in the same overall shapes, sizes and configurations to those fibers previously described.

The amounts of fiber degrading accelerant used with any of the embodiments described may vary and may depend upon a variety of factors. These may include the specific environmental conditions of use (e.g. formation temperature, fluid pH, etc.), the type of accelerant used and its activity, the type of polymer used, etc. Typically, the amount of fiber degrading accelerant used with the polymer fibers being degraded will range in a weight ratio from about 2:1 to about 1:100 of accelerant to polymer, more particularly from 1:1 to about 1:20, and more particularly from about 1:2 to about 1:10. Thus, for example, a weight ratio of 1:1 for the accelerant/fiber may be used within the treatment fluid or the accelerant may compose 50% by weight of the fibers themselves, such as when it is incorporated into the polymer fiber or coextruded with the fibers to form multi-component fibers.

Any of the above-described techniques may be used for the delayed or controlled degradation of the polymer fibers. A combination of any or all of these techniques may be used in any given treatment as well.

The following examples serve to further illustrate the disclosure.

EXAMPLES

The action of a kill pill according to the present disclosure may be divided into two independent properties: (1) the ability of the fluid to plug openings; and (2) the ability of the fluid to degrade with time and temperature, thereby reestablishing fluid movement.

In all examples the treatment fluid composition was used. All components were mixed in water in a concentration listed in the table below.

Example 1

This example illustrates that designed system is able to plug fractures in the formation, thus preventing further fluid movement.

Formulation was prepared according to the table below.

TABLE 1

Variant of treatment fluid composition.

| Component | Xanthan gum | PLA fibers | 100 mesh PLA particles (d50 = 85 mµ) |
|---|---|---|---|
| Concentration | 3 g/l | 17.3 g/l | 100 g/l |

A pump 101 was connected to a tube 102 (FIG. 1). The internal tube volume was 500 mL. A piston 103 was fitted inside the tube. A pressure sensor 104 was fitted at the end of the tube between the piston and the end of the tube that was connected to the pump. A slot assembly 105 was attached to the other end of the tube.

Figure 2:
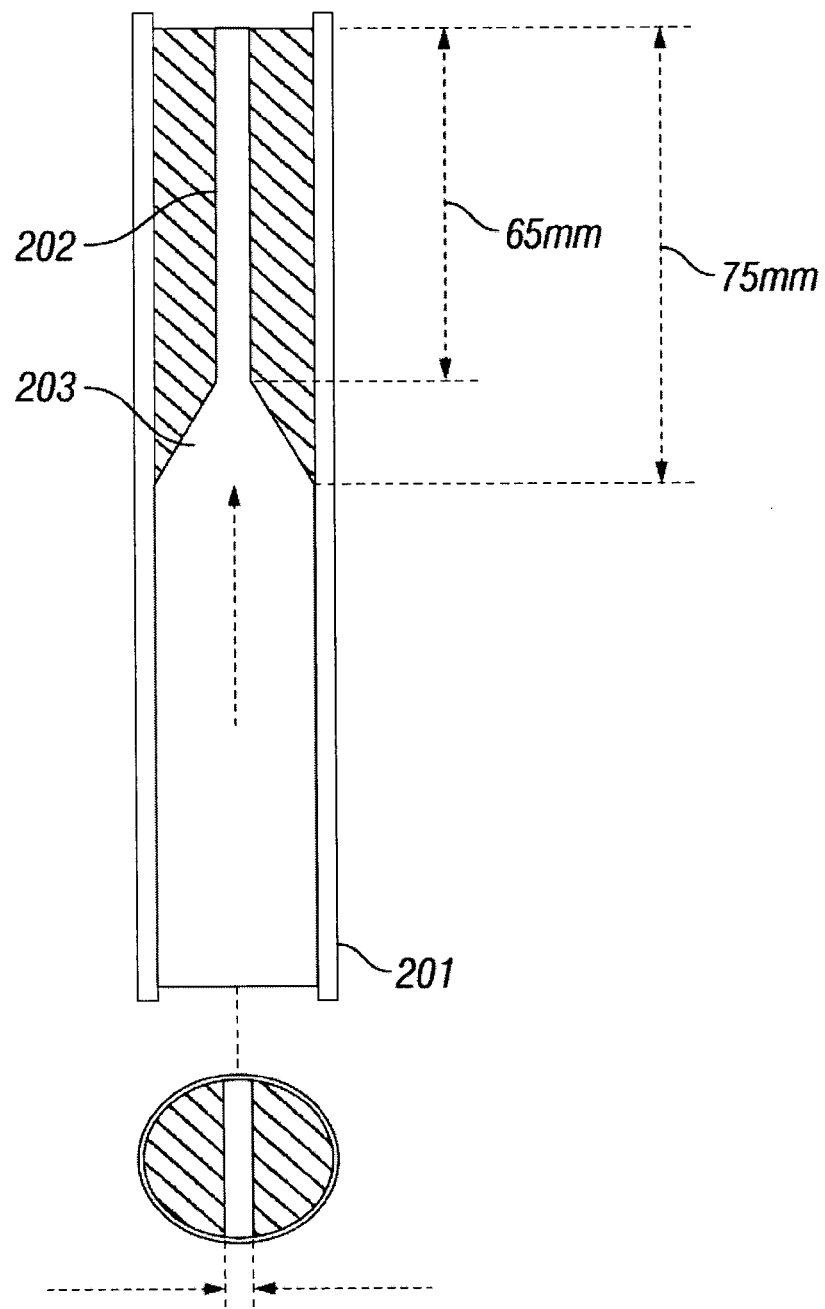
FIG. 2 shows a magnified view of a cylinder in which a slot has been cut. The slot simulates a fracture in the downhole formation.

A detailed view of the slot assembly is shown in FIG. 2. The outer part of the assembly was a tube 201 whose dimensions are 130 mm long and 21 mm in diameter. The slot 202 was 65 mm long. Various slots were available with widths varying between 1 mm and 5 mm. A 10-mm long tapered section 203 precedes the slot.

During the experiment, the test fluid was pumped through the 5-mm slot. If plugging took place, a rapid pressure rise was observed. The test terminated when the pressure reached the 34.5-bar (500-psi) limit.

The piston 103 was then added. Water was then pumped into the tube at a constant rate of 750 mL/min and pressure was monitored. During treatment fluid pumping, the fibers and particles formed an impermeable plug resulting in a rapid system-pressure rise to 34.5 bar and almost no leakage through the slot.

Figure 3:
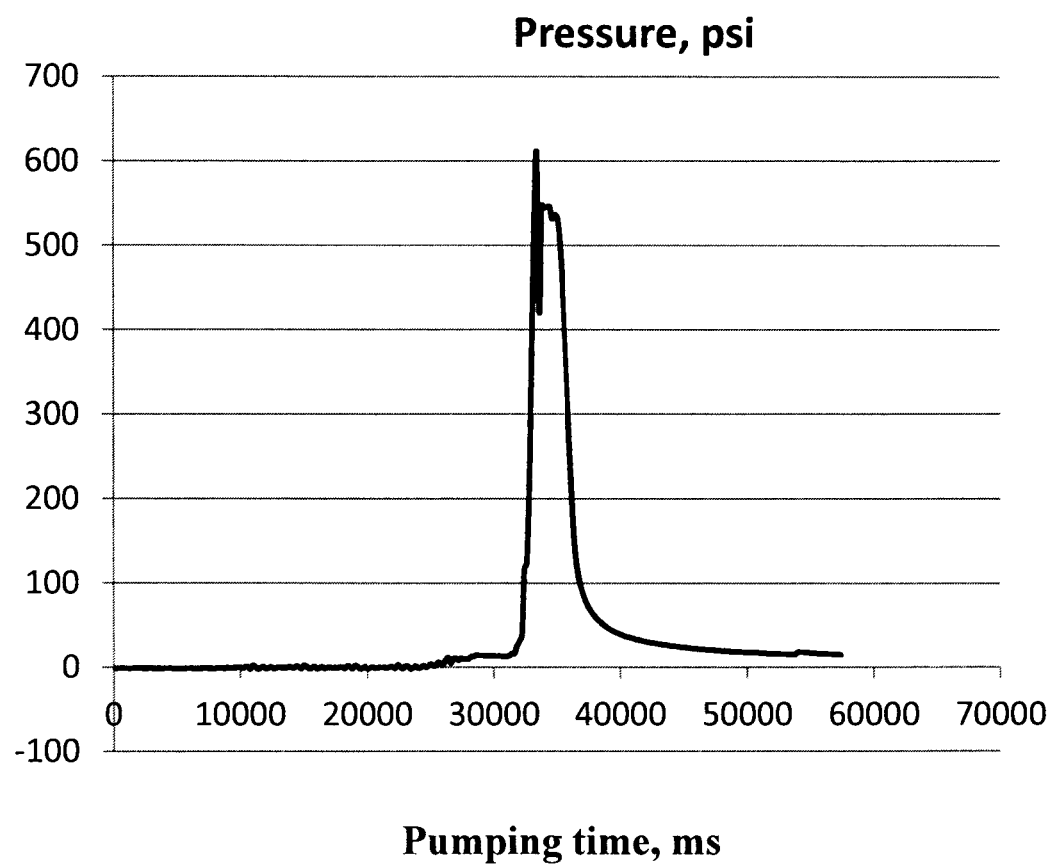
FIG. 3 shows a pressure difference versus time plot indicating the formation of a fiber plug in the slot of FIG. 2.

A plot showing the evolution of pressure difference versus treatment time is presented in FIG. 3.

Example 2

This example confirms ability of the system to dissolve under downhole conditions.

Formulation was prepared according to the table below.

TABLE 2

Variant of treatment fluid composition.

| Component | Polyacrylamide | PLA fibers | PGA particles (20 mµ) | Ca(OH)$_2$ |
|---|---|---|---|---|
| Concentration | 2 g/l | 7 g/l | 16 g/l | 20 g/l |

100 ml of the solution was prepared as per design above and incubated at 40° C. for 48 hours. After 48 hours incubation no solid in the treatment fluid remains were observed in the solution. This example demonstrates complete dissolving of a plug (filter cake) dissolves in downhole conditions in a presence of degradation accelerant.

Example 3

This example confirms ability of the system to form a filter cake and prevent fluid flow between the wellbore and formation in a presence of chelating agents.

Formulation was prepared according to the table below.

TABLE 3

Variant of treatment fluid composition.

| Component | Guar | PLA fibers | PGA particles (20 mµ) | Na$_4$EDTA | Ca(OH)$_2$ |
|---|---|---|---|---|---|
| Concentration | 3 g/l | 8.56 g/l | 16 g/l | 8 g/l | 20 g/l |

Example was made using a filter press to simulate a fluid loss zone. The apparatus consisted of a solid stainless steel cylinder with a slot installed in the lower part of the apparatus. The slot was a filter screen with 250 µm openings with a single 2 mm hole simulating a bigger fracture (FIG. 2).

Figure 4:
FIG. 4 shows a filter cake formed as a result of the experiment.

A ¾ inch valve was installed below the slot. The test method consisted of feeling the apparatus (with a bottom valve closed) with a test fluid. Then upper cover was installed and differential pressure of 100 psi was applied. Opening the bottom valve started the filtration of the fluid. Once filter cake is formed fluid flow was terminated and the cell could keep the pressure inside. After bleeding off differential pressure slot was extracted and the filter cake was observed (FIG. 4).

Although various embodiments have been described with respect to enabling disclosures, it is to be understood that this document is not limited to the disclosed embodiments. Variations and modifications that would occur to one of skill in the art upon reading the specification are also within the scope of the disclosure, which is defined in the appended claims.

The invention claimed is:

1. A method for treating a subterranean well having a borehole, comprising:
    (i) providing a treatment fluid comprising a carrier fluid, a chelating agent, and a degradable material in the form of particles, fibers, or both;
    (ii) placing the treatment fluid in the borehole such that the treatment fluid contacts a liner, a downhole filter, a natural or induced fracture, a perforation or a subterranean formation or combinations thereof;
    (iii) allowing the treatment fluid to flow into the liner, downhole filter, perforation, natural or induced fracture or subterranean formation, whereby the degradable material forms filter cake that prevents or reduces further fluid movement between wellbore and subterranean formation,
    wherein the chelating agent promotes formation of the filter cake.

2. The method of claim 1, wherein the carrier fluid comprises water, brine, or water based drilling fluid.

3. The method of claim 1, wherein the carrier fluid is a water solution of polymer comprising guar, hydroxypropyl guar, carboxymethylhydroxyethyl guar, carboxymethylhydroxypropyl guar, methylcellulose, ethyl cellulose, hydroxyethylcellulose, hydroxypropylcellulose, carboxymethylcellulose, d-glucopyranuronic acid polymer with 6-deoxy-1-mannose, d-glucose and d-mannos, acetone-formaldehyde-sodium bisulfate polymer, xanthan gum, diutan gum, polyacrylamide or combinations thereof.

4. The method of claim 1, wherein the carrier fluid comprises oil based drilling fluid, produced oil, diesel oil, or synthetic oil.

5. The method of claim 1, wherein the carrier fluid further comprises clay stabilizers, biocide, polymer breakers, mutual solvent, and combinations thereof.

6. The method of claim 1, wherein the degradable material is present at a concentration between 5 kg/m$^3$ and 603 kg/m$^3$.

7. The method of claim 6, wherein the degradable material is in the form of the particles and the degradable particles have an average particle size (d50) between 5 micrometers and 500 micrometers.

8. The method of claim 6, wherein the degradable material is in the form of the particles and the degradable particles are present in at least two discrete groups, each having different average particle sizes.

9. The method of claim 1, wherein the degradable material is in the form of the fibers and the degradable fibers have a length between 1 mm and 30 mm, and a diameter between 8 micrometers to 200 micrometers.

10. The method of claim 1, wherein the degradable material is in the form of the fibers and the degradable fibers comprise substituted and unsubstituted lactide, glycolide, polylactic acid, polyglycolic acid, a copolymer of polylactic acid and polyglycolic acid, a copolymer of glycolic acid with other hydroxy-, carboxylic acid-, or hydroxycarboxylic acid-containing moieties, a copolymer of lactic acid with other hydroxy-, carboxylic acid or hydroxycarboxylic acid-containing moieties, hydroxyacetic acid (glycolic acid) with itself or other hydroxy-, carboxylic acid-, or hydroxycarboxylic acid-containing moieties, polyvinyl alcohol, polyamide or polyethyleneterephtalate or combinations thereof.

11. The method of claim 1, wherein the treatment fluid further comprises a dissolution accelerant, the accelerant being present at a concentration such that the accelerant and degradable material weight ratio is between 1:1 and 1:100.

12. The method of claim 11, wherein the accelerant comprises a base that comprises calcium hydroxide, calcium oxide, magnesium hydroxide, magnesium oxide or zinc oxide or combinations thereof.

13. The method of claim 11, wherein the accelerant comprises an acid that comprises oleic acid, benzoic acid, nitrobenzoic acid, stearic acid, uric acid or fatty acids or combinations of derivatives thereof.

14. The method of claim 11, wherein the accelerant comprises an encapsulated oxidizer that comprises a bromate, a persulfate, a nitrate, a nitrite, a chlorite, a hypochlorite, a perchlorate or a perborate or a combination thereof.

15. The method of claim 1, where the treating is for preventing or reducing further fluid movement between wellbore and subterranean formation during workover operations.

16. A method for treating a subterranean well having a borehole, comprising:
  (i) preparing a treatment fluid comprising a carrier fluid, a chelating agent, and a degradable material in the form of particles, fibers, or both;
  (ii) placing the treatment fluid in the borehole such that the treatment fluid contacts a liner, a natural fracture, an induced fracture, a downhole filter, a perforation or subterranean formation or combinations thereof;
  (iii) allowing the treatment fluid to flow into the liner, downhole filter, perforation, natural or induced fracture or subterranean formation, whereby the degradable material forms filter cake that prevents or reduces further fluid movement between wellbore and subterranean formation;
  (iv) allowing the degradable material to dissolve, thereby reestablishing fluid movement between the subterranean formation and the wellbore,
wherein the chelating agent promotes formation of the filter cake.

* * * * *